(12) United States Patent
Ishikawa

(10) Patent No.: US 10,148,455 B2
(45) Date of Patent: *Dec. 4, 2018

(54) DATA PROCESSING APPARATUS, METHOD FOR CONTROLLING DATA PROCESSING APPARATUS, AND PROGRAM

(71) Applicant: CANON KABUSHIKI KAISHA, Tokyo (JP)

(72) Inventor: Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 245 days.

This patent is subject to a terminal disclaimer.

(21) Appl. No.: 14/658,694

(22) Filed: Mar. 16, 2015

(65) Prior Publication Data

US 2015/0188726 A1 Jul. 2, 2015

Related U.S. Application Data

(63) Continuation of application No. 13/139,502, filed as application No. PCT/JP2010/050741 on Jan. 5, 2010, now Pat. No. 9,021,126.

(30) Foreign Application Priority Data

Mar. 3, 2009 (JP) .................. 2009-049713

(51) Int. Cl.
*G06F 15/173* (2006.01)
*H04L 12/423* (2006.01)
(Continued)

(52) U.S. Cl.
CPC .......... *H04L 12/423* (2013.01); *G06F 9/4494* (2018.02); *G06F 15/17337* (2013.01);
(Continued)

(58) Field of Classification Search
CPC ..... H04L 12/5601; H04L 12/00; H04L 12/40; H04L 12/42; H04L 12/422; H04L 12/423;
(Continued)

(56) References Cited

U.S. PATENT DOCUMENTS 4,554,659 A * 11/1985 Blood .................. H04L 12/433
370/437
4,615,029 A * 9/1986 Hu ........................ H04L 12/423
370/449
(Continued)

FOREIGN PATENT DOCUMENTS

JP 62-42260 2/1987
JP 01-23340 1/1989
(Continued)

OTHER PUBLICATIONS

Yong M. Chong, "A Data-Flow Architecture for Digital Image Processing", Wescon Conference Record, XX,XX,I, Jan. 1984 (Jan. 1, 1984), pp. 4/601-4/610.
(Continued)

*Primary Examiner* — Anthony Mejia
(74) *Attorney, Agent, or Firm* — Fitzpatrick, Cella, Harper & Scinto

(57) ABSTRACT

A data processing apparatus includes multiple processing means that are connected in a ring shape via corresponding communication means respectively. Each communication means includes a reception means for receiving data from a previous communication means, and a transmission means for transmitting data to a next communication means. Connection information is assigned to each of the reception means and the transmission means. The communication means, when receiving a packet that has same connection information as one assigned to its reception means, causes the corresponding processing means to perform data processing on the packet, sets the connection information
(Continued)

assigned to its transmission means to the packet, and transmits the packet to the next communication means, and when receiving a packet that has connection information that is not same as one assigned to its reception means, transmits the packet to the next communication means without changing the connection information of the packet.

15 Claims, 8 Drawing Sheets

(51) Int. Cl.
  *H04L 12/741* (2013.01)
  *H04L 12/801* (2013.01)
  *G06F 9/448* (2018.01)
(52) U.S. Cl.
  CPC ............ *H04L 45/745* (2013.01); *H04L 47/34* (2013.01); *Y10S 707/99937* (2013.01); *Y10S 707/99951* (2013.01)
(58) Field of Classification Search
  CPC ....... H04L 12/437; H04L 12/54; H04L 12/56; H04L 12/741; H04L 12/801; G06F 13/4022; G06F 15/17337; G06F 9/4436
  See application file for complete search history.

(56) References Cited

U.S. PATENT DOCUMENTS

| | | | | |
|---|---|---|---|---|
| 4,768,190 A * | 8/1988 | Giancarlo | | H04L 12/64 370/400 |
| 4,884,192 A * | 11/1989 | Terada | | G06F 15/8015 709/251 |
| 5,155,858 A * | 10/1992 | DeBruler | | G06F 9/505 712/30 |
| 5,216,670 A * | 6/1993 | Ofek | | H04L 45/04 370/403 |
| 5,274,637 A * | 12/1993 | Sakamura | | H04L 12/433 370/455 |
| 5,490,145 A * | 2/1996 | Tanabe | | H04L 12/433 370/452 |
| 5,539,747 A * | 7/1996 | Ito | | H04L 12/5602 370/235 |
| 5,666,484 A * | 9/1997 | Orimo | | G06F 15/17337 714/18 |
| 5,764,392 A * | 6/1998 | Van As | | H04L 12/40006 370/460 |
| 5,896,384 A * | 4/1999 | Erickson | | H04L 12/42 370/452 |
| 6,026,425 A * | 2/2000 | Suguri | | G06F 9/5083 709/223 |
| 6,028,837 A * | 2/2000 | Miller | | H04L 12/42 340/2.7 |
| 6,246,692 B1 * | 6/2001 | Dai | | H04L 12/42 370/438 |
| 6,370,579 B1 * | 4/2002 | Partridge | | H04L 45/00 370/498 |
| 6,496,516 B1 * | 12/2002 | Dabecki | | H04L 12/42 370/406 |
| 6,594,237 B1 * | 7/2003 | Kiuchi | | H04L 12/5601 370/250 |
| 6,611,871 B1 * | 8/2003 | Kada | | H04J 3/14 370/395.1 |
| 6,959,358 B2 * | 10/2005 | Regev | | G06F 17/30982 365/108 |
| 7,304,998 B2 * | 12/2007 | Kada | | H04J 3/14 370/258 |
| 7,352,765 B2 * | 4/2008 | Dai | | H04L 12/42 370/424 |
| 7,379,067 B2 * | 5/2008 | Deering | | G06T 15/005 345/506 |
| 7,933,049 B2 | 4/2011 | Yoshitani | | |
| 2002/0012340 A1 * | 1/2002 | Kalkunte | | H04L 12/18 370/360 |
| 2002/0015413 A1 * | 2/2002 | Kaganoi | | H04L 12/433 370/403 |
| 2002/0075836 A1 * | 6/2002 | Uematsu | | H04L 29/12216 370/338 |
| 2004/0100954 A1 * | 5/2004 | Dai | | H04L 12/42 370/389 |
| 2006/0050702 A1 * | 3/2006 | Matsui | | H04L 41/0893 370/392 |
| 2007/0211725 A1 * | 9/2007 | Kawata | | H04L 12/4625 370/392 |
| 2008/0317022 A1 * | 12/2008 | Ahmed | | H04H 40/18 370/389 |
| 2009/0060196 A1 * | 3/2009 | Fujiwara | | H04L 63/08 380/277 |
| 2009/0168791 A1 * | 7/2009 | Hamamoto | | H04J 3/0632 370/412 |
| 2009/0210709 A1 * | 8/2009 | Fujiwara | | H04N 21/2347 713/171 |
| 2011/0060855 A1 * | 3/2011 | Kuschke | | G05B 19/042 710/106 |
| 2011/0255549 A1 * | 10/2011 | Nakamura | | H04L 12/403 370/401 |
| 2013/0100963 A1 * | 4/2013 | Hartman | | H04L 49/602 370/463 |

FOREIGN PATENT DOCUMENTS

JP    2518293    7/1996
JP    2834210    12/1998

OTHER PUBLICATIONS

PCT International Search Report in corresponding International Application No. PCT/JP2010/050741, dated Aug. 4, 2010.
Written Opinion of the International Searching Authority in corresponding International Application No. PCT/JP2010/050741, dated Aug. 4, 2010.
Japanese Office Action dated Aug. 5, 2013 issued during prosecution of related Japanese application No. 2009-049713.

\* cited by examiner

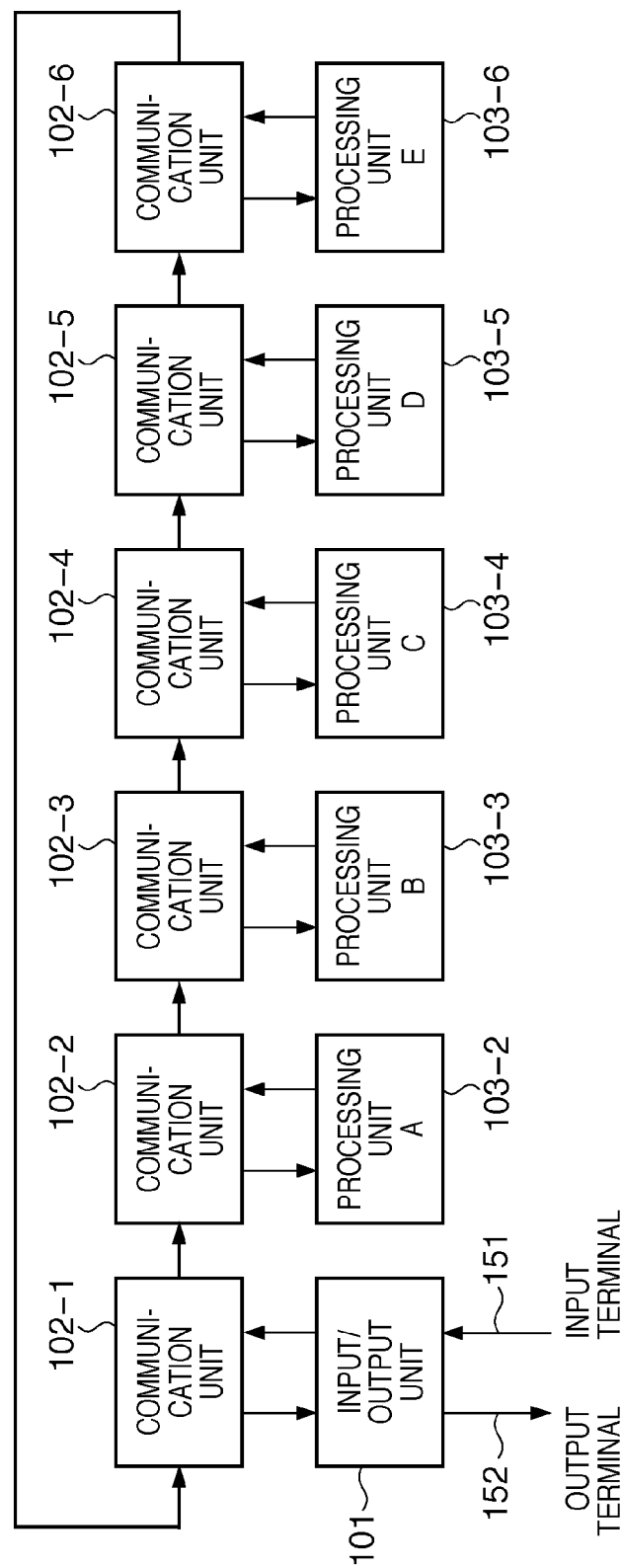

DATA PROCESSING APPARATUS, METHOD FOR CONTROLLING DATA PROCESSING APPARATUS, AND PROGRAM

This application is a continuation of application Ser. No. 13/139,502, filed Jun. 13, 2011, which is a Section 371 of international Application No. PCT/JP2010/050741, filed Jan. 5, 2010, the contents of each of which are incorporated by reference.

TECHNICAL FIELD

The present invention relates to a data processing apparatus and a method for controlling the same, and particularly relates to technology for realizing complicated processing by controlling the flow of data (data flow) into a plurality of data processing units.

BACKGROUND ART

Conventionally, a method has been known in which in order to efficiently realize a data processing series such as print image processing at high speed, all data processing is divided into prescribed functions so as to be provided by hardware; modules implemented using said hardware are then connected in the order of processing flow, and a data processing series is executed through pipelining. On the other hand, in image processing, processing can be efficiently realized by changing the order of a processing series.

For example, if an image is output to an output apparatus having a prescribed number of pixels, although resolution conversion is necessary in order to adjust the number of pixels (resolution), if the number of pixels of an input image is greater than the number of pixels of the output apparatus, it is better to perform processing after the number of pixels is reduced by performing resolution conversion upstream of processing. On the other hand, if the number of pixels of an input image is smaller than the number of pixels of the output apparatus, image quality is better if processing is performed in the state with a smaller number of pixels without performing resolution conversion and, thereafter, resolution conversion is performed immediately before output (downstream).

Further, for example, also in the case in which processing is performed after a certain space (for example, an input device space) is converted into standard space (for example, a resolution of 600 dpi and the CIELAB color space, or the like), and then the resultant space is converted into another space (for example, an output device space), the processing order is a problem. In other words, the processing order performed by a space conversion unit on an input side and that on an output side are opposite (the processing order of processing such as one-dimensional LUT, matrix operation, and three-dimensional LUT). That is, if the processing order can be changed, the same processing module can also be shared on the input side and the output side.

However, in data processing for performing pipeline processing using modules to which a prescribed function is assigned, the processing order cannot be changed. Accordingly, an example case as described above is handled by implementing a plurality of modules that have the same function, which is a waste in the efficient use of resources.

In order to solve the aforementioned problem, a configuration in which processing modules are connected via a ring shaped network is proposed (Japanese Patent Laid-Open No. 01-023340, Japanese Patent No. 2518293). According to these techniques, by changing the connection destination of data using such a ring shaped network, it is possible to change the processing order. Note that in the configuration disclosed in Japanese Patent No. 2518293, since each processing module is respectively executed by a processor, it is also possible to change the processing order by changing the program of each processor. Further, Japanese Patent No. 2834210 discloses a data flow control method in which expandability and maintainability have been improved by using broadcast communication.

However, in the configurations disclosed in Japanese Patent Laid-Open No. 01-023340 and Japanese Patent No. 2518293, the connecting relationship for processing data is set to one to one. Accordingly, it is not possible to control complicated data paths, such as separating a data path into branches (the same data being referenced by a plurality of modules), simultaneously executing a plurality of data paths, and performing time division multiplexing processing with a processing module.

Further, if broadcast communication is used as disclosed in the configuration of Japanese Patent No. 2834210, it is possible to separate a data path into branches (reference the same data by a plurality of modules). However, it is not possible to control complicated data paths, such as integrating data paths, simultaneously executing a plurality of data paths, and performing time division multiplexing processing with a processing module. Note that in the case of using broadcast communication, there is also a disadvantage in that the ring bus occupancy will increase since a transmission packet is not basically erased until it returns to a transmission source. Further, with the configuration disclosed in Japanese Patent No. 2834210, since a module in a state in which it is unable to receive erases a packet, after waiting one ring's worth of time or more, a transmission source starts retransmission processing. Accordingly, there has been a problem in that not only does control become complicated, but also transfer efficiency remarkably falls.

DISCLOSURE OF INVENTION

The present invention has been conceived in view of the aforementioned problems, and provides technology for enabling a change of the processing order with a simple configuration and, furthermore, enabling data processing with complicated data paths, such as separating a data path into branches, integrating data paths, and simultaneously executing a plurality of data paths.

According to one aspect of the present invention, a data processing apparatus includes a plurality of processing means for performing prescribed data processing that are connected in a ring shape in a prescribed order via communication means respectively corresponding thereto, wherein each of the communication means includes a reception means for receiving data from a previous communication means in the order, and a transmission means for transmitting data to a next communication means in the order, to each of the reception means and the transmission means, connection information for identifying logical connection of data processing is assigned, the communication means, in a case of receiving a packet that has same connection information as the connection information that is assigned to the reception means of the communication means, causes the corresponding processing means to perform data processing on the packet, sets the connection information that is assigned to the transmission means of the communication means to the packet on which data processing has been performed, and transmits the packet to the next communication means in the order, and in a case of receiving a packet that has connection information that is not same as the connection information that is assigned to the reception means of the communication means, transmits the packet to the next communication means in the order without changing the connection information of the packet.

According to another aspect of the present invention, a method for controlling a data processing apparatus comprising a plurality of processing means for performing prescribed data processing that are connected in a ring shape in a prescribed order via communication means respectively corresponding thereto, wherein each of the communication means executes a reception step in which a reception means receives data from a previous communication means in the order, and a transmission step in which a transmission means transmits data to a next communication means in the order, to each of the reception means and the transmission means, connection information for identifying a logical connection of data processing is assigned, the communication means, in a case of receiving a packet that has same connection information as the connection information that is assigned to the reception means of the communication means, executes steps of causing the corresponding processing means to perform data processing on the packet, setting the connection information that is assigned to the transmission means of the communication means to the packet on which data processing has been performed, and transmitting the packet to the next communication means in the order, and in a case of receiving a packet that has connection information that is not same as the connection information that is assigned to the reception means of the communication means, executes a step of transmitting the packet to the next communication means in the order without changing the connection information of the packet.

According to still another aspect of the present invention, a program causes each of a plurality of modules that have a reception means and a transmission means as communication means, and are connected in a ring shape in a prescribed order to execute:

a reception step in which the reception means receives data from a previous communication means in the order;

a transmission step in which the transmission means transmits data to a next communication means in the order;

connection information for identifying logical connection of data processing is assigned to the reception means and the transmission means, and in a case of receiving a packet that has same connection information as the connection information that is assigned to the reception means of the communication means, steps of causing the corresponding processing means to perform data processing on the packet, setting the connection information that is assigned to the transmission means of the communication means to the packet on which data processing has been performed, and transmitting the packet to the next communication means in the order; and in a case of receiving a packet that has connection information that is not same as the connection information that is assigned to the reception means of the communication means, a step of transmitting the packet to the next communication means in the order without changing the connection information of the packet.

Further features of the present invention will become apparent from the following description of exemplary embodiments with reference to the attached drawings.

BRIEF DESCRIPTION OF DRAWINGS

FIG. 6 is a block diagram showing an example of a configuration of the data processing apparatus in the case of five data processing units being provided.

BEST MODE FOR CARRYING OUT THE INVENTION

Embodiments of the present invention are described below. Of course, the following embodiments are intended to provide disclosure to allow a person skilled in the technical field of the present invention to easily practice it, and are merely some of the embodiments of the present invention specified in the scope of the claims. Therefore, it is obvious for a person skilled in the art that even embodiments that are not directly described in this specification are included in the technical scope of the present invention, as far as the technical ideas thereof are commonly applied. It should be noted that although a plurality of embodiments are described for the sake of convenience, a person skilled in the art will easily understand that not only these embodiments are individually realized as an invention, but of course, the invention is realized by combining a plurality of embodiments as appropriate. Hereinafter, embodiments according to the present invention are described in detail in accordance with the attached drawings.

Configuration of Data Processing Apparatus

Figure 1:
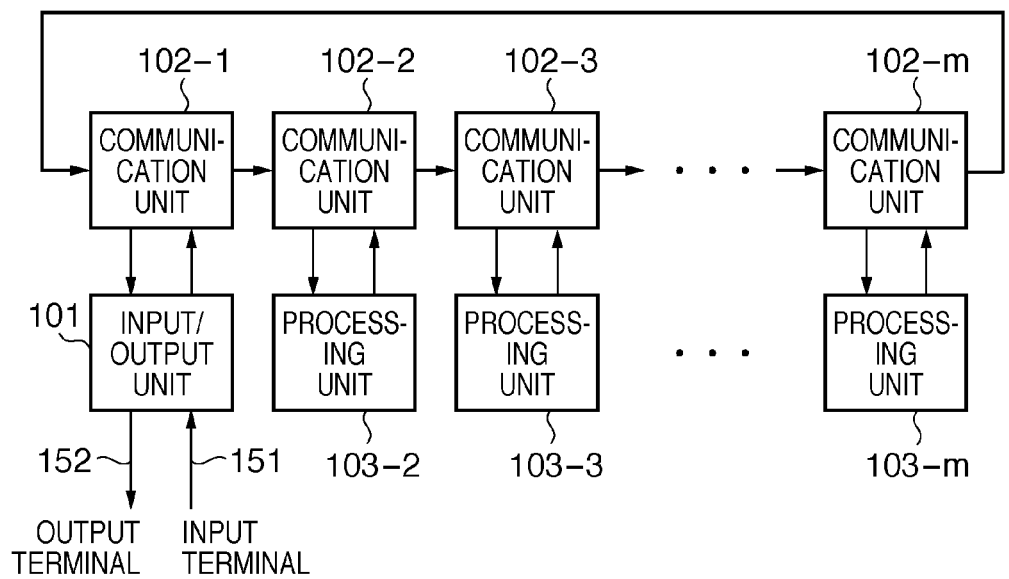
FIG. 1 is a block diagram showing an example of a configuration of a data processing apparatus according to an embodiment of the present invention.

FIG. 1 is a block diagram showing an example of a configuration of a data processing apparatus according to the present invention. In FIG. 1, reference numeral 101 denotes a data input/output unit (input/output unit) serving as an input/output means that inputs data to be processed and outputs data that has been processed. Further, reference numerals 102-1 to 102-m denote communication units (collectively, a communication unit 102) serving as communication means, and reference numerals 103-2 to 103-m denote data processing units (processing units, and collectively, a data processing unit 103) serving as processing means.

The communication units 102-1 to 102-m are connected to the communication units that are adjacent thereto, respectively (note that the communication unit 102-m is connected to the communication unit 102-1), and constitute a ring bus. Furthermore, the communication units 102-1 to 102-m transmit and receive data between the ring bus and the data input/output unit 101 or the data processing units 103-2 to 103-m. Accordingly, the communication units 102-2 to 102-m are connected to the data processing unit 103-2 to 103-m, respectively.

Data input from an input terminal 151 is input to the communication unit 102-1 via the data input/output unit 101. The input data is packetized and is passed onto the ring bus. The communication unit 102 takes in a necessary packet from the ring bus in accordance with information that has been set in advance, extracts data from the packet that has been taken in, and inputs the extracted data to the data processing unit 103. The data processing unit 103 performs prescribed data processing thereon (for example, color space conversion, resolution conversion, or the like), and outputs the data after processing to the communication unit 102.

The data after processing is packetized in the communication unit 102, and is passed onto the ring bus. In this way, by the communication units 102-2 to 102-m, data is successively processed in the data processing units 103-2 to 103-m in the order that has been set in advance. Then, data for which the set data processing has ended is taken into the data input/output unit 101 via the communication unit 102-1, and is output from an output terminal 152. Note that the data input/output unit 101 serves as an interface with an external device (or a module), and can be omitted if the communication unit 102-1 can serve as a direct interface.

Here, the outline of operations performed by a data processing apparatus according to the present embodiment is described. In the data processing apparatus according to the present embodiment, a plurality of the data processing units 103 that perform prescribed data processing and the data input/output unit 101 are connected in a ring shape in the prescribed order via the communication units 102 corresponding thereto, respectively. As described later, each of the communication units 102 is provided with a reception unit 201 that receives data from the previous communication unit 102 in the order, and a transmission unit 204 that transmits data to the next communication unit 102 in the order. Further, connection identifier information (connection information) for identifying the processing order of data processing (logical connection of data processing units or communication units) is assigned to each of the reception unit 201 and the transmission unit 204. In such a configuration, in the case of receiving a packet that has the same identifier information as the connection identifier information that is assigned to the reception unit 201 of the communication unit 102, the communication unit 102 causes the corresponding data processing unit 103 to perform data processing on the packet. Then, connection identifier information that is assigned to the transmission unit 204 of the communication unit 102 is set to the packet on which data processing has been performed, and the resultant packet is transmitted to the next communication unit 102 in the order.

On the other hand, in the case of receiving a packet that has identifier information that is not the same as the connection identifier information that is assigned to the reception unit 201 of the communication unit 102, the packet is transmitted to the next communication unit 102 in the order, without the identifier information thereof being changed. In this way, by controlling the transmission channel of a packet by assigning connection identifier information to each of the reception unit 201 and the transmission unit 204, data processing with a complicated data path can be efficiently realized. Hereinafter, the detailed configuration of the communication unit 102 is described.

Communication Unit

Figure 2:
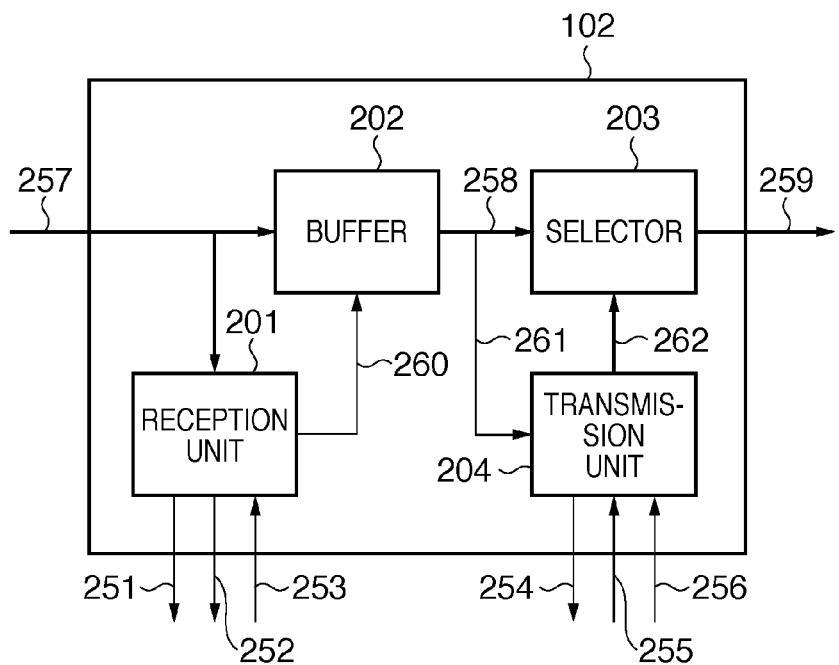
FIG. 2 is a block diagram showing an example of a configuration of a communication unit.

FIG. 2 is a block diagram showing an example of a configuration of the communication unit 102. In FIG. 2, reference numeral 201 denotes a data reception unit (reception unit), reference numeral 202 denotes a buffer, reference numeral 203 denotes a selector, and reference numeral 204 denotes a data transmission unit (transmission unit).

An output terminal 259 of the adjacent communication unit is connected to an input terminal 257; thus, the communication units 102-1 to 102-m constitute a ring bus. Further, signal lines 251, 252, 253, 254, 255, and 256 are connected to the corresponding data processing unit 103 (one of 103-2 to 103-m). Note that the signal lines 251 to 256 of the communication unit 102-1 are connected to the data input/output unit 101.

Figure 5:
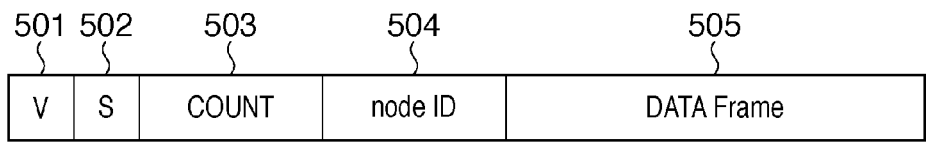
FIG. 5 is a diagram showing an example of a configuration of a packet that is passed onto a ring bus.

FIG. 5 is a schematic diagram showing an example of a configuration of a packet that is passed onto the ring bus. In FIG. 5, reference numeral 501 denotes a valid flag that shows that the packet is valid, and reference numeral 502 denotes a stall flag that shows that reception of the packet is held. Reference numeral 503 denotes a count value that shows the transmission order of data, reference numeral 504 denotes a connection identifier for identifying a logical data connection, and reference numeral 505 denotes data to be input to or output from the communication unit 102.

The packet input from the adjacent communication unit is once held in the buffer 202, and is output to the selector 203 at the next clock cycle. The data reception unit 201 monitors a packet from the input terminal 257, and if all of the following are satisfied, takes in this packet, and outputs the data thereof to the data processing unit 103 from the output terminal 252 (validating the valid signal 251):

The valid flag of the packet is valid, the connection identifier and count value thereof match those held in the reception unit 201, and the data processing unit 103 that is connected can input data (the stall signal 253 is not in a holding state).

At this time, the data reception unit 201 notifies the buffer 202 that the data is taken in via a signal line 260, and clears the valid flag of the packet stored in the buffer 202, so as to invalidate the packet. Further, after taking in the packet, the count value 503 that the reception unit 201 holds is incremented.

On the other hand, if all of the following are satisfied, the data reception unit 201 notifies the buffer 202 of a data hold via the signal line 260, and sets the stall flag of the packet stored in the buffer 202:

The valid flag of the input packet is valid, the connection identifier and count value thereof match those held in the reception unit 201, and the data processing unit 103 that is connected cannot input data (the stall signal 253 is in a holding state).

Further, in the case in which, even though the valid flag of the input packet is valid and the connection identifier matches, the count value does not match the value that the reception unit 201 holds, since data cannot be taken in, a stall flag is also set in this case. Note that as described in an operation example described later, it is not necessary to evaluate a count value in determining whether or not to receive a packet.

The data transmission unit 204 monitors the valid flag of the output packet (a signal line 258) from the buffer 202. Since data cannot be output onto the ring bus when a valid flag is valid, the data transmission unit 204 sets the stall signal 254 in order to hold the output of data from the data processing unit 103 that is connected. Note that when a valid flag is invalid, the stall signal 254 is reset. If both of the following are satisfied, the data transmission unit 204 validates a valid flag and invalidates a stall flag, adds a count value and a connection identifier set in a register, and generates a packet:

Data can be output from the data processing unit 103 that is connected (if the valid signal 256 is valid), and the valid flag of the output packet from the buffer 202 is invalid.

Then, the selector 203 is controlled, and this generated packet is passed onto the ring bus from the output terminal 259. After outputting the packet, the count value that the data transmission unit 204 holds is incremented. Note that as described in an operation example described later, with the configuration in which a count value is not evaluated, it is not necessary to increment a count value (for example, in the case of performing processing in which a problem due to the packet processing order being switched does not occur, the case in which the packet processing order is not switched, or the case in which packet processing is not held, a count value is not necessarily needed).

Data Reception Unit

Figure 3:
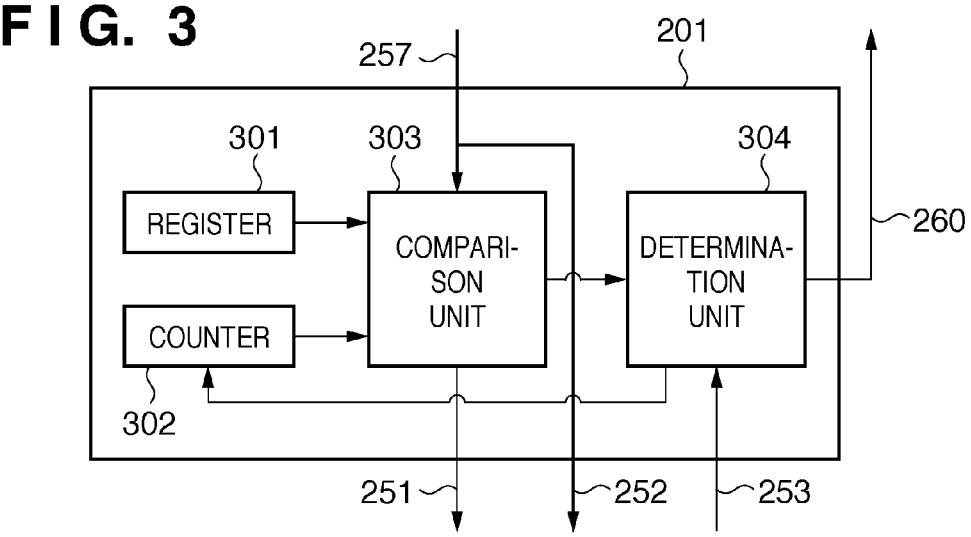
FIG. 3 is a block diagram showing an example of a configuration of a data reception unit.

FIG. 3 is a block diagram showing an example of a configuration of the data reception unit 201. In FIG. 3, reference numeral 301 denotes a register, reference numeral 302 denotes a counter as a first holding means, reference numeral 303 denotes a comparison unit, and reference numeral 304 denotes a determination unit.

The comparison unit 303 monitors a valid flag, a connection identifier, and a count value of a packet on the ring bus input from the input terminal 257. Then, if all of the following are satisfied, the valid signal 251 is validated:

The valid flag of the packet is valid, the connection identifier of the packet matches a connection identifier that is stored in the register 301, and the count value of the packet matches the value in the counter 302.

Note that a data portion of this packet is output to the output terminal 252. Further, the comparison unit 303 inputs the following into the determination unit 304:

An input packet determination signal showing that the valid flag of the input packet is valid, and the connection identifier of this packet matches a connection identifier stored in the register 301, and a count-value matching signal showing that the count value of this packet matched the value in the counter 302. The determination unit 304 determines whether or not the data processing unit 103 was able to take in data based on an input packet determination signal, a count-value matching signal, and the stall signal 253 from the data processing unit 103 that is connected. If it is determined that the data processing unit 103 was able to take in data, the data reception unit 201 notifies the buffer 202 that the data is taken in via the signal line 260, and clears the valid flag of the packet stored in the buffer 202, so as to invalidate the packet. Note that, as is described later, for branching data (using data in a plurality of data processing units), this packet invalidating processing can be turned ON/OFF by a CPU, for instance.

A data taking-in notification signal is also input to the counter 302, and if it is determined that data could be taken in, in order to obtain the next data, the count value in the counter 302 is incremented (+1) at a next clock cycle. On the other hand, based on an input packet determination signal, a count-value matching signal, and the stall signal 253 from the data processing unit 103 that is connected, if it is determined that the data that is to be taken in cannot be taken in, the data reception unit 201 notifies the buffer 202 of a data hold via the signal line 260. Furthermore, the stall flag of the packet stored in the buffer 202 is set. Further, when it is determined that the order in which the data is taken in is not appropriate although it is a packet to be taken in, based on an input packet determination signal and a count-value matching signal, similar processing is performed. Specifically, via the signal line 260, the data reception unit 201 notifies the buffer 202 of a data hold, and sets the stall flag of the packet stored in the buffer 202. Note that although a description has been given regarding the case of evaluating a count value here, if a count value is not evaluated, it is not necessary to transmit and receive a signal regarding a count value.

Data Transmission Unit

Figure 4:
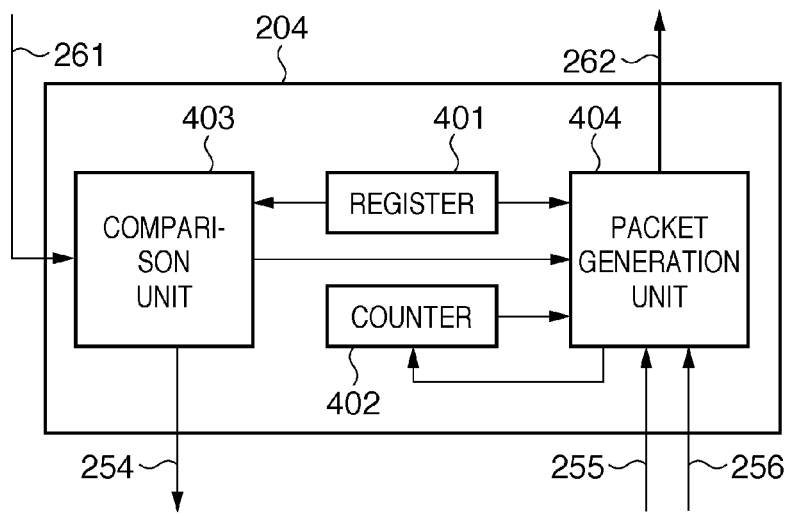
FIG. 4 is a block diagram showing an example of a configuration of a data transmission unit.

FIG. 4 is a block diagram showing an example of a configuration of the data transmission unit 204. In FIG. 4, reference numeral 401 denotes a register, reference numeral 402 denotes a counter as a second holding means, reference numeral 403 denotes a comparison unit, and reference numeral 404 denotes a packet generation unit.

The comparison unit 403 monitors the valid flag, the stall flag, and the connection identifier of an output packet (the signal line 258) from the buffer 202. Since data cannot be output onto the ring bus when a valid flag is valid, in order to hold the data output from the data processing unit 103 that is connected, the stall signal 254 is set. Note that when a valid flag is invalid, the stall signal 254 is reset.

If both of the following are satisfied, the comparison unit 403 determines that the packet output by the unit itself was not held and returned:

The valid flag of the output packet from the buffer 202 is valid, and the stall flag thereof does not show that it is held, and the connection identifier of the output packet from the buffer 202 matches the connection identifier stored in the register 401.

Then, the comparison unit 403 controls the selector 203 via the packet generation unit 404, and a valid flag is invalidated so as to invalidate the packet. Since a packet can also be output in this case, the stall signal 254 is reset.

The packet generation unit 404 refers to the valid signal 256 from the data processing unit 103 that is connected. If it is determined that data can be output from the data processing unit 103 (if the valid signal 256 is valid), and if an output packet from the buffer 202 matches one of the following cases, a valid flag is validated and a stall flag is invalidated and, then, a count value in the counter 402 and a connection identifier set in the register 401 are added so as to generate a packet:

The case in which the valid flag of that output packet is invalid, and the case in which the packet is to be invalidated (when the valid flag is valid and the stall flag does not show that it is held, and the connection identifier of the packet matches a connection identifier stored in the register 401).

Then, the packet generation unit 404 controls the selector 203 so as to pass the generated packet onto the ring bus from the output terminal 259. Furthermore, at the next clock cycle, the count value in the counter 402 is incremented (+1). Note that since the counter 402 of the transmission unit 204 and the counter 302 of the reception unit 201 that receives a packet from this transmission unit synchronize, the counters are initialized to the same value before starting data transfer. Note that although a description has been given regarding the case of evaluating a count value here, if a count value is not evaluated, it is not necessary to execute processing regarding a count value.

Operations Performed by Data Processing Apparatus

Next, operations performed by the data processing apparatus according to the present embodiment are described with reference to the drawings. FIG. 6 is a block diagram in the case of five data processing units being provided. As shown in FIG. 6, it is assumed that each of the data processing units 103-2 to 103-6 performs the processing indicated by the processing units A to E, respectively, on input data. In order to simplify the description below, a description is given regarding the case in which input data is not held in the data processing unit 103 and the input/output unit 101. In this case, the stall flag and a count value of a packet are not necessary. Operations in such a configuration are described using a signal flow graph. In the signal flow graph, a node is expressed with a "circle" and processing is expressed with an "arrow".

Operation Example 1

Figure 7A:
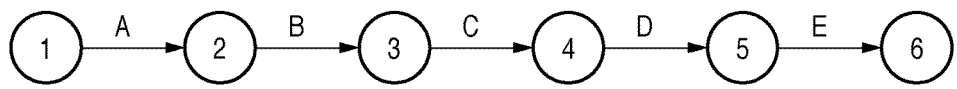
FIGS. 7A, 7B, 7C, and 7D are diagrams showing examples of signal flow graphs.

First, if it is assumed that processing is simply performed in the order from processing A, processing B, processing C, processing D, and processing E, a signal flow graph is as shown in FIG. 7A. At this time, "1" is stored in the register (register 301) of the reception unit 201 of the communication unit 102-2 corresponding to the processing unit A (data processing unit 103-2), and "2" is stored in the register (register 401) of the transmission unit 204 of the communication unit 102-2. Similarly, "2" is stored in the register of the reception unit 201 of the communication unit 102-3, and "3" is stored in the register of the transmission unit 204 thereof;

"3" is stored in the register of the reception unit 201 of the communication unit 102-4, and "4" is stored in the register of the transmission unit 204 thereof;

"4" is stored in the register of the reception unit 201 of the communication unit 102-5, and "5" is stored in the register of the transmission unit 204 thereof; and "5" is stored in the register of the reception unit 201 of the communication unit 102-6, and "6" is stored in the register of the transmission unit 204 thereof.

Since the input terminal 151 corresponds to a node "1" and the output terminal 152 corresponds to a node "6", "6" is stored in the register of the reception unit 201 of the communication unit 102-1, and "1" is stored in the register of the transmission unit 204 thereof.

The communication unit 102-1 adds a connection identifier "1" to the data input from the input terminal 151, and outputs the resultant data to the communication unit 102-2. Since "1" is stored in the register 301 of the reception unit of the communication unit 102-2, the communication unit 102-2 takes in the packet having the connection identifier "1", and inputs a data portion thereof to the data processing unit 103-2. The data processing unit 103-2 performs processing A on the input data, and outputs the resultant data to the communication unit 102-2. Since "2" is stored in the register 401 of the transmission unit of the communication unit 102-2, the communication unit 102-2 generates a packet having a connection identifier "2" and outputs the generated packet to the communication unit 102-3.

Since "2" is stored in the register 301 of the reception unit of the communication unit 102-3, the communication unit 102-3 takes in the packet having the connection identifier "2", and the data processing unit 103-3 performs processing B thereon, and outputs the result to the communication unit 102-3. Since "3" is stored in the register 401 of the transmission unit of the communication unit 102-3, the communication unit 102-3 generates a packet having a connection identifier "3" and outputs the generated packet to the communication unit 102-4.

Similarly, the communication unit 102-4 takes in the packet having the connection identifier "3", the data processing unit 103-4 performs processing C thereon, so that a packet having a connection identifier "4" is generated and is output to the communication unit 102-5. The communication unit 102-5 takes in the packet having the connection identifier "4", and the data processing unit 103-5 performs processing D thereon, so that a packet having a connection identifier "5" is generated and is output to the communication unit 102-6. The communication unit 102-6 takes in the packet having the connection identifier "5", and the data processing unit 103-6 performs processing E thereon, so that a packet having a connection identifier "6" is generated and is output to the communication unit 102-1. Since "6" is stored in the register 301 of the reception unit of the communication unit 102-1, the communication unit 102-1 takes in the packet having the connection identifier "6", and outputs a data portion thereof from the output terminal 152. In this way, the input data is processed in the order from processing A, processing B, processing C, processing D, and processing E, and the resultant data is output.

Operation Example 2

Figure 7B:
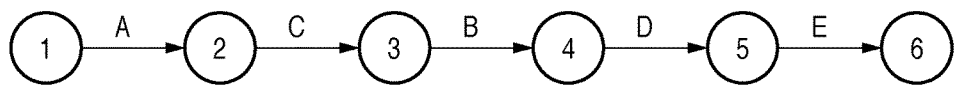

FIG. 7B is a signal flow graph in which the order of processing B and processing C is inverted. In this case, "3" is stored in the register of the reception unit 201 of the communication unit 102-3, and "4" is stored in the register of the transmission unit 204 thereof. Then, "2" is stored in the register of the reception unit 201 of the communication unit 102-4, and "3" is stored in the register of the transmission unit 204 thereof. Since the values set in other registers are the same as those in the example shown in FIG. 7A, a description thereof is omitted.

The communication unit 102-1 adds the connection identifier "1" to the data input from the input terminal 151, and outputs the resultant data to the communication unit 102-2. The communication unit 102-2 takes in the packet having the connection identifier "1", and the data processing unit 103-2 performs processing A thereon, so that a packet having the connection identifier "2" is generated, and the generated packet is output to the communication unit 102-3.

Since "3" is stored in the register 301 of the reception unit of the communication unit 102-3, the communication unit 102-3 does not take in any packet other than a packet having the connection identifier "3", and outputs the packet to the communication unit 102-4 as it is. Therefore, the above-mentioned packet having the connection identifier "2" is output to the communication unit 102-4, without any processing being performed thereon. The communication unit 102-4 takes in the packet having the connection identifier "2", and the data processing unit 103-4 performs processing C thereon, so that a packet having the connection identifier "3" is generated, and the generated packet is output to the communication unit 102-5.

Since "4" is stored in the register 301 of the reception unit of the communication unit 102-5, the communication unit 102-5 does not take in the packet having the connection identifier "3" and outputs the packet to the communication unit 102-4 as it is. Similarly, the communication unit 102-6, the communication unit 102-1, and the communication unit 102-2 do not perform any processing on a packet having the connection identifier "3". Therefore, after four clock cycles since the communication unit 102-4 has output the packet, the packet having the connection identifier "3" reaches the communication unit 102-3 and is taken in, and the data processing unit 103-3 performs processing B thereon, so that a packet having the connection identifier "4" is generated, and the generated packet is output to the communication unit 102-4.

Since "2" is stored in the register 301 of the reception unit of the communication unit 102-4, the communication unit 102-4 does not take in the packet having the connection identifier "4" and outputs the packet to the communication unit 102-5 as it is. The communication unit 102-5 takes in the packet having the connection identifier "4", and the data processing unit 103-5 performs processing D thereon, so that a packet having the connection identifier "5" is generated, and the generated packet is output to the communication unit 102-6. The communication unit 102-6 takes in the packet having the connection identifier "5", and the data processing unit 103-6 performs processing E thereon, so that a packet having the connection identifier "6" is generated, and the generated packet is output to the communication unit 102-1. Since "6" is stored in the register 301 of the reception unit of the communication unit 102-1, the communication unit 102-1 takes in the packet having the connection identifier "6", and outputs a data portion thereof from the output terminal 152. In this way, the input data is processed in the order from processing A, processing C, processing B, processing D, and processing E, and the resultant data is output.

Operation Example 3

Figure 7C:
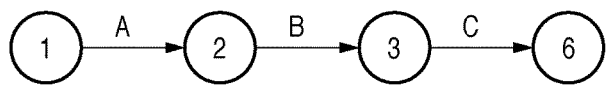

FIG. 7C is a signal flow graph in which processing D and processing E are eliminated. In this case, it is sufficient to change the value set in the register of the transmission unit 204 of the communication unit 102-4 to "6". Since the values set in other registers are the same as those in the example shown in FIG. 7A, a description thereof is omitted. Note that a value that is not used in the signal flow graph is set to the registers of the reception units 201 of the communication unit 102-5 and the communication unit 102-6, so that a packet will not be taken therein.

Operation Example 4

Figure 7D:
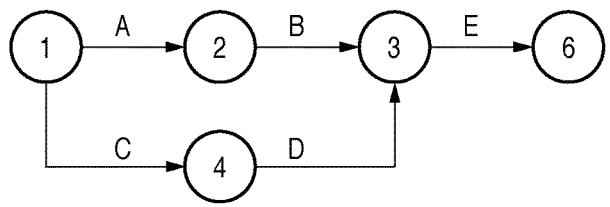

FIG. 7D shows an example of a signal flow graph including branching/integration. Such a signal flow is effective in the case of performing the following processing, for example:

(1) Using two of the same image, processing is performed on one of the images in which a low-frequency component is extracted therefrom by applying an LPF (low pass filter), and processing is performed on the other image in which a high frequency component is extracted therefrom by applying an HPF (high pass filter); and (2) the low-frequency component and the high frequency component of the images are composited so as to generate an output image.

The following is a description regarding the case in which processing including branching/integration is executed using a count value.

In order that data pieces from two lines that have been branched and processed are synchronized and taken in by the communication unit 102-6, before starting processing, the counter 402 of the transmission unit of the communication unit 102-3 is initialized to "0", and the counter 402 of the transmission unit of the communication unit 102-5 is initialized to "1". Further, the above-mentioned two counters are incremented by an increment of 2 (that is, +2 every time a packet is output). By setting the counters in this way, the communication unit 102-6 can alternately receive the output from the communication unit 102-3, and the output from the communication unit 102-5. Further, since the communication unit 102-4 also needs to take in the packet that the communication unit 102-2 takes in, the communication unit 102-2 does not invalidate the packet that has been taken in, and is set so as to output the packet to the communication unit 102-3 as it is. In other words, the input packet invalidating processing described above is set to OFF.

Next, operations are described following the data flow. The communication unit 102-1 adds the connection identifier "1" to the data input from the input terminal 151, and outputs the resultant data to the communication unit 102-2. Since "1" is stored in the register 301 of the reception unit of the communication unit 102-2, the communication unit 102-2 takes in the packet having the connection identifier "1", and inputs a data portion thereof to the data processing unit 103-2. Further, the input packet invalidating processing is set to OFF in the communication unit 102-2 to branch data and, accordingly, the communication unit 102-2 does not invalidate (erase) the packet that has been taken in, and outputs the packet to the communication unit 102-3 as it is. On the other hand, the data processing unit 103-2 performs processing A on the input data, and the resultant data is output to the communication unit 102-2. Since "2" is stored in the register 401 of the transmission unit of the communication unit 102-2, a packet having the connection identifier "2" is generated, and the generated packet is output to the communication unit 102-3.

The communication unit 102-3 takes in the packet having the connection identifier "2", and the data processing unit 103-3 performs processing B on that packet, so that a packet having the connection identifier "3" is generated, and the generated packet is output to the communication unit 102-4. At this time, the initial value "0" is added as a count value. Further, the counter 402 of the transmission unit is incremented by an increment of 2 for transmitting a next packet (that is, +2 every time a packet is output).

Since "1" is stored in the register 301 of the reception unit of the communication unit 102-4, the communication unit 102-4 does not take in the packet having the connection identifier "3", and outputs the packet to the communication unit 102-5 as it is. Similarly, the communication unit 102-5 does not perform any processing on the packet either, and outputs the packet to the communication unit 102-6 as it is.

Since "3" is stored in the register 301 of the reception unit of the communication unit 102-6, and the counter 302 of the reception unit is initialized to "0", the communication unit 102-6 takes in the packet having the connection identifier "3" and the count value "0", and inputs a data portion thereof to the data processing unit 103-6. At this time, in order to receive the data on which processing D has been performed next, the counter 302 of the reception unit is incremented (+1).

Since the packet branched by the communication unit 102-2 has the connection identifier "1", the communication unit 102-3 does not perform any processing thereon, and outputs the packet to the communication unit 102-4. Since "1" is stored in the register 301 of the reception unit of the communication unit 102-4, the communication unit 102-4 takes in the packet having the connection identifier "1", and outputs a data portion thereof to the data processing unit 103-4. Note that since this packet will no longer be used by other data processing units, invalidating processing is performed thereon to facilitate effective use of the ring bus. The data processing unit 103-4 performs processing C on the input data, and outputs the resultant data to the communication unit 102-4. Since "4" is stored in the register 401 of the transmission unit of the communication unit 102-4, the communication unit 102-4 generates a packet having the connection identifier "4", and outputs the generated packet to the communication unit 102-5.

The communication unit 102-5 takes in the packet having the connection identifier "4", the data processing unit 103-5 performs processing D thereon, so that a packet having the connection identifier "3" is generated, and the generated packet is output to the communication unit 102-6. At this time, the initial value "1" is added as a count value. Further, the counter 402 of the transmission unit is incremented by an increment of 2 for transmitting the next packet (that is, +2 every time a packet is output).

Since "3" is stored in the register 301 of the reception unit of the communication unit 102-6, and the counter 302 of the reception unit is incremented so as to be "1", the communication unit 102-6 takes in a packet having the connection identifier "3" and the count value "1", and inputs a data portion thereof to the data processing unit 103-6. At this time, in order to receive the data on which processing B has been performed next, the counter 302 of the reception unit is incremented (+1).

By performing the above operations, the data on which processing A and processing B have been performed is input for the even numbered times, and the data on which processing C and processing D have been performed is input for the odd numbered times, sequentially, to the data processing unit 103-6. The data processing unit 103-6 (processing E) composites (integrates) these data pieces, and outputs the result to the communication unit 102-6. Since "6" is stored in the register 401 of the transmission unit of the communication unit 102-6, the communication unit 102-6 generates a packet having the connection identifier "6", and outputs the generated packet to the communication unit 102-1. Since "6" is stored in the register 301 of the reception unit of the communication unit 102-1, the communication unit 102-1 takes in the packet having the connection identifier "6", and outputs a data portion thereof from the output terminal 152. The input data is branched and processed through two lines, namely, a line including processing A and processing B and a line including processing C and processing D, and composite processing is performed on the resultant data pieces in processing E, and the composited data is output.

Operation Example 5

Similarly, it is also possible to separate a data path into branches based on a count value or to perform different processing on data arranged in specific intervals. For example, it is also possible to divide pixels into even-numbered pixels and odd-numbered pixels, and perform different processing thereon, easily. A description is given using an example in which in the signal flow graph shown in FIG. 7D, processing A and processing B are performed on even-numbered pixels, processing including processing C and processing D is performed on odd-numbered pixels, and processing E is performed where the pixels input for processing E are integrated.

Also in this case, similar to Operation Example 4, in order that data pieces from two lines that have been branched and processed are synchronized and taken in by the communication unit 102-6, before starting processing, the counter 402 of the transmission unit of the communication unit 102-3 is initialized to "0", and the counter 402 of the transmission unit of the communication unit 102-5 is initialized to "1". Further, the above-mentioned two counters are incremented by an increment of 2 (that is, +2 every time a packet is output). In addition to this, in order that pixels are divided into even-numbered pixels and odd-numbered pixels and processed, before starting processing, the counter 302 of the reception unit of the communication unit 102-2 is initialized to "0", and the counter 302 of the reception unit of the communication unit 102-4 is initialized to "1". Further, the above-mentioned two counters are incremented by an increment of 2 (that is, +2 every time a packet is output). By setting such settings, the communication unit 102-2 takes in a packet having an even-numbered count value, and the communication unit 102-4 takes in a packet having an odd-numbered count value. Note that in this case, since the same data is not referenced, the packet that has been taken in may be invalidated (the input packet invalidating processing is set to ON).

Example of System Configuration

Figure 8:
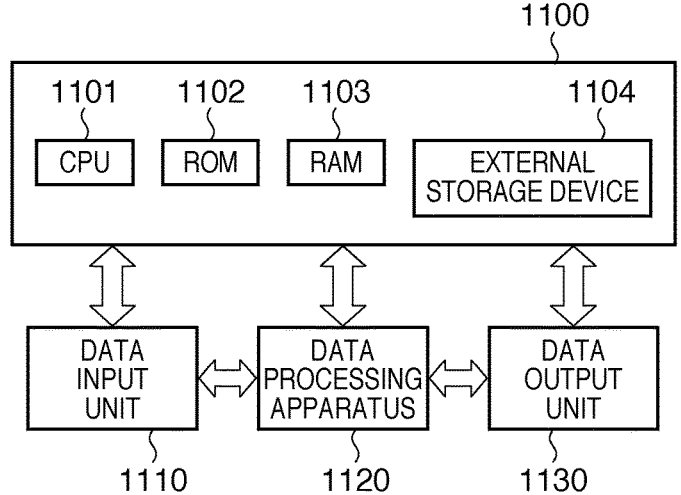
FIG. 8 is a block diagram showing an example of a configuration of a system that has the data processing apparatus according to the embodiment of the present invention.

FIG. 8 shows an example of a configuration of a system that has the data processing apparatus according to the present embodiment. Reference numeral 1100 denotes a system control unit that is provided with a CPU 1101 for arithmetic control, a ROM 1102 that stores fixed data and a program, a RAM 1103 that is used for temporarily saving data and loading a program, an external storage device 1104 that holds external data, and so on.

Reference numeral 1110 denotes a data input unit that takes in data to be processed from outside the system. For example, the data input unit 1110 may be realized by an image reading apparatus that has devices, such as an image scanner and an A/D converter, an audio input apparatus that has devices, such as a microphone and an A/D converter, or the like.

Reference numeral 1120 denotes a data processing apparatus according to the present embodiment. Reference numeral 1130 denotes a data output unit that outputs data processed in this system to the outside. For example, the data output unit 1130 may be realized by an image output apparatus including a printer device that converts image data into a print dot pattern and outputs the result, or an audio output apparatus that outputs audio data through a D/A converter, for instance.

Data input in the data input unit 1110 may be sent to the system control unit and processed by the CPU 1101, or may be temporarily recorded on the RAM 1103 or the external storage device 1104 as it is. Thus, the data processing apparatus 1120 may directly accept input data from the data input unit 1110 and perform processing thereon, or may perform processing by receiving instructions and data supplied from the system control unit 1100.

Further, the output from the data processing apparatus 1120 may be again sent to the system control unit 1100, or may be directly sent to the data output unit 1130. Based on the control of the system control unit 1100, a variety of data processing content is set in the data processing apparatus 1120, and then the data processing apparatus 1120 is supplied with a variety of processing, executes processing according to the settings, and outputs the processed data to the outside.

Control Procedure

Figure 9:
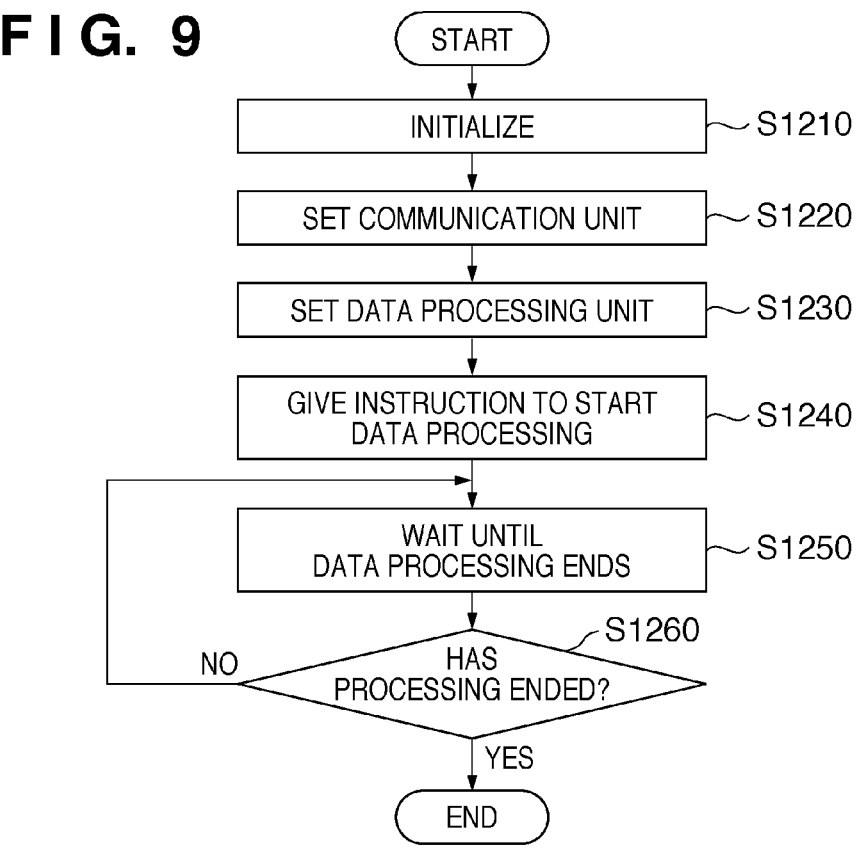
FIG. 9 is a flowchart showing a control procedure performed by the data processing apparatus.

The procedure in which the system control unit controls the data processing apparatus 1120 is shown in FIG. 9. When control processing is started, in step S1210, the data processing apparatus 1120 is reset. At this time, the buffer 202 that constitutes the ring bus, the registers 301 and 401 that set a connection identifier, the counters 302 and 402 that show the data order, a counter increment register (not shown), a packet invalidating setting register (not shown), and so on are initialized.

In step S1220, the registers 301 and 401 that store connection identifiers of the communication units are set. Further, the initial values and increments of the counters 302 and 402 that show the data order, the packet invalidating setting register, and so on are set as necessary.

In step S1230, parameter designation for the data processing unit, and the like are performed. Next, in step S1240, an instruction to start the data processing apparatus 1120 is given.

In step S1250, processing for monitoring an end notice from the data processing apparatus 1120 is performed, and this is repeated until it is determined that the end of processing has been detected in step S1260. In step S1260, if an end notice from the data processing apparatus 1120 is confirmed (YES in step S1260), the processing ends.

As described above, the data processing apparatus according to the present embodiment sets the node numbers in a signal flow graph in the registers of the communication unit, and controls the data flow using these node numbers. Thereby, it is possible to configure data flows that correspond to various signal flow graphs.

Further, in the present embodiment, the transmission unit 204 that is provided to at least one of the communication units 102 is provided with the counter 402 that holds a counter value. Then, if a packet that has the same identifier information as connection identifier information assigned to the corresponding reception unit 201 is received, a counter value held by the counter 402 is set in a packet on which data processing has been performed, and the resultant packet is transmitted to the next communication unit 102 in the order. Furthermore, the counter value held by the counter 402 is incremented by a first value. On the other hand, the reception unit 201 provided to at least one of the communication units 102 is also provided with the counter 302 that holds a counter value. Then, only in the case of receiving a packet that has both of the following, the communication unit 102 causes the corresponding data processing unit 103 to perform data processing on that packet, and increments the counter value held by the counter 302 by a second value:

The same identifier information as the connection identifier information assigned to the reception unit 201 of the communication unit 102, and the same counter value as the counter value held by the counter 302 of the reception unit 201. Therefore, according to the present embodiment, it is possible to execute data processing with complicated data paths, such as separating a data path into branches, integrating data paths, or simultaneously executing a plurality of data paths, by appropriately setting the following, for instance:

Connection identifier information that is to be assigned to the transmission unit and the reception unit, and the transmission unit and the reception unit that increment the counter values, and increment values of the counters (the first increment value, the second increment value).

Further, in the case of receiving a packet that has the same identifier information as the connection identifier information assigned to the reception unit 201 of the communication unit 102, at least one of the communication units 102:

transmits, to the next communication unit 102 in the order, a packet to which the connection identifier information assigned to the transmission unit 204 of the communication unit 102 has been set, and on which data processing has been performed; and also transmits the received packet to the next communication unit 102 in the order without changing the identifier information thereof.

Accordingly, it is possible to perform different data processing, respectively, on the same data using the different data processing units 103, and to monitor a data processing result obtained by a certain data processing unit.

Note that counter values held by the counters 402 and 302 may be initialized (first initialization, second initialization). Alternatively, the increment value of the counter 402 (first value), and the increment value of the counter 302 (second value) may be set (first setting, second setting). This setting can be set by a user inputting an instruction, or by reading out data that shows details of the settings from a storage device. Accordingly, data processing can be arbitrarily customized.

Further, in the present embodiment, registers (storage means) that store connection identifier information to be assigned to the reception unit 201 and the transmission unit 204 of the communication unit 102 are provided. Accordingly, by appropriately setting the contents stored in the registers, the data processing flow can be arbitrarily customized.

Figure 10:
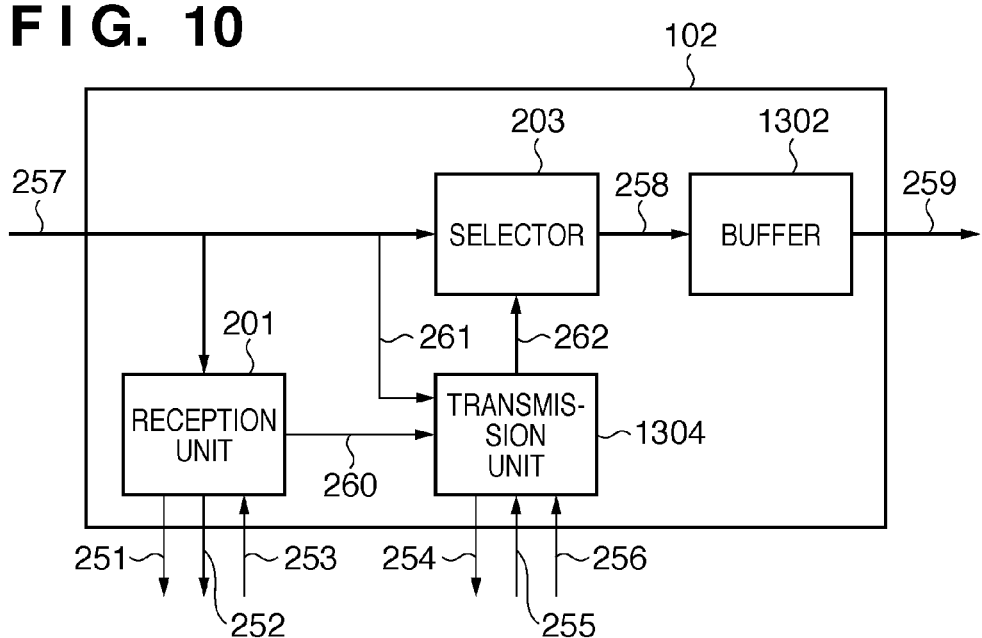
FIG. 10 is a block diagram showing another example of a configuration of the communication unit.

Note that in the description given above, although the buffer of the communication unit 102 is arranged between the reception unit 201 and transmission unit 204, the configuration is not limited to this, and for example, as shown in FIG. 10, the buffer may be arranged downstream of the selector 203. In this case, the setting of a stall flag to hold a packet and the clearance of a valid flag to invalidate a received packet are performed by the selector 203 via a transmission unit 1304. Alternatively, after packets are received by the buffer, processing may be performed by the reception unit and the transmission unit.

Figure 11:
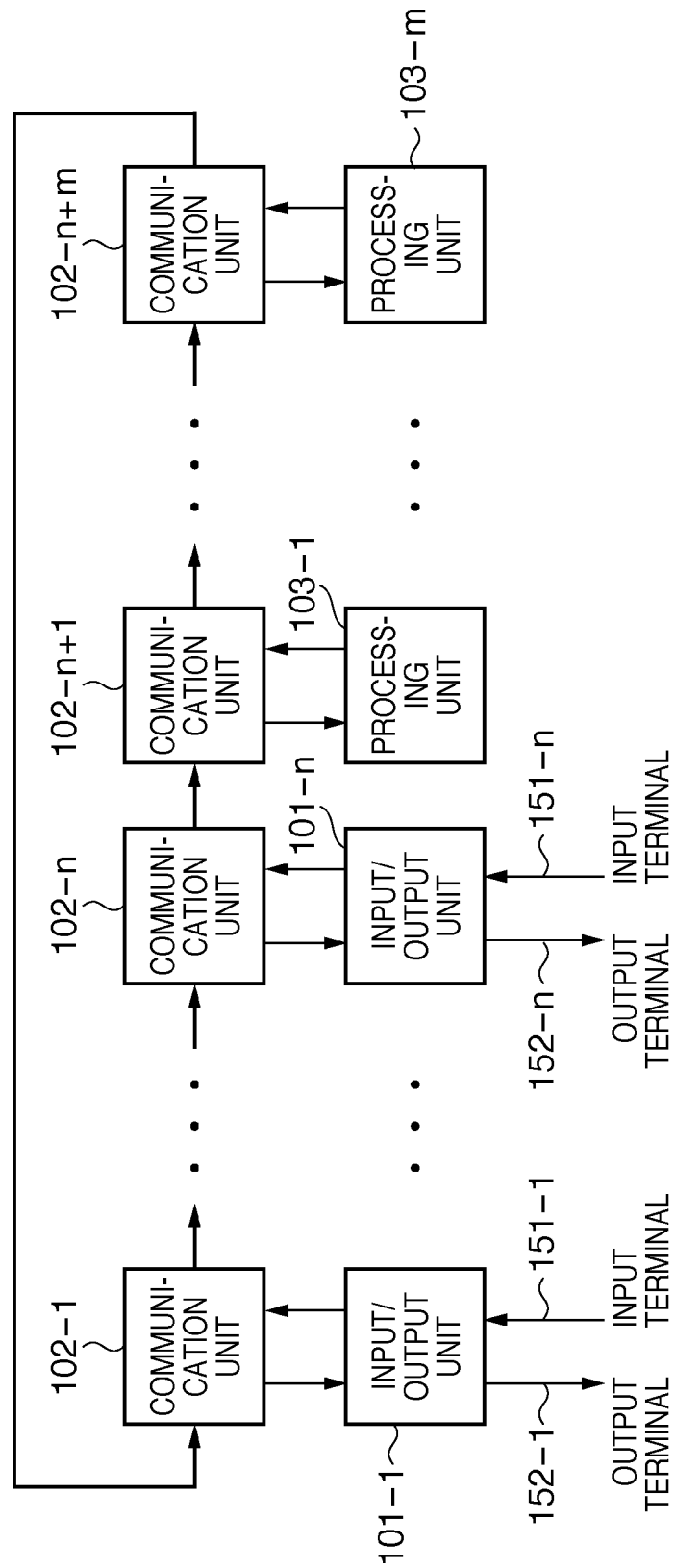
FIG. 11 is a block diagram showing an example of a configuration of the data processing apparatus according to the embodiment of the present invention.

FIG. 11 shows another example of a configuration of a data processing apparatus. In FIG. 11, reference numerals 101-1 to 101-*n* denote n data input/output units, reference numerals 102-1 to 102-*n*+m denote n+m communication units, and reference numerals 103-1 to 103-*m* denote m data processing units.

The configuration shown in FIG. 11 is a configuration to which another data input/output unit 101 has been added in order to simultaneously realize a plurality of different data paths. Note that since operations performed by the data input/output unit 101, the communication unit 102, and the data processing unit 103, respectively, are similar to those described above, a description thereof is omitted.

Figure 12:
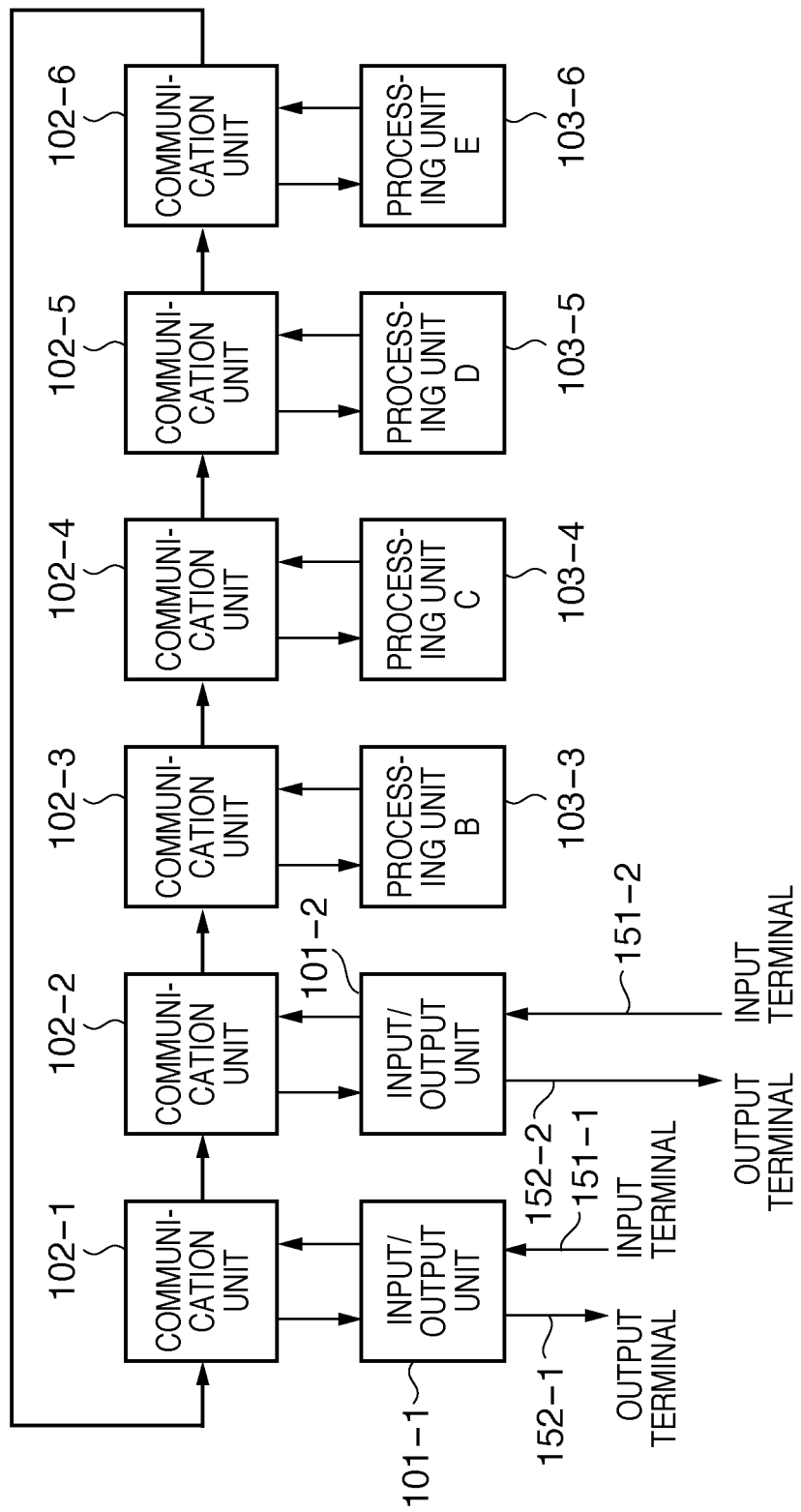
FIG. 12 is a block diagram showing an example of a configuration of the data processing apparatus in the case of two input/output units and five data processing units being provided.

Next, operations are described using a signal flow graph. In order to simplify the description, as shown in FIG. 12, using an example in which a data processing apparatus is constituted so as to be provided with two data input/output units and four data processing units, operations in the case of simultaneously processing two data paths are described.

Operation Example 1

Figure 13:
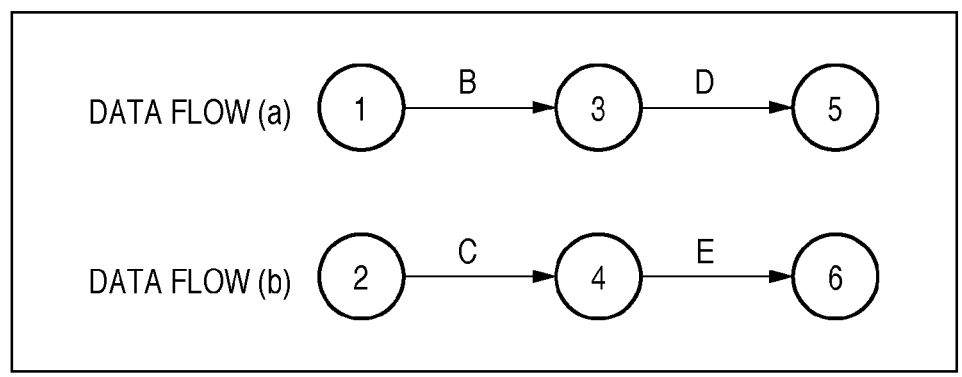
FIG. 13 is a diagram showing examples of signal flow graphs for simultaneously processing two data flows.

The case in which a data flow (a) and a data flow (b) shown in FIG. 13 are simultaneously processed is described. First, in order to configure the data flow (a), "1" is stored in the register (the register 301) of the reception unit of the communication unit 102-3 corresponding to the processing unit B (the data processing unit 103-3), and "3" is stored in the register (the register 401) of the transmission unit of the communication unit 102-3. "3" is stored in the register of the reception unit of the communication unit 102-5 corresponding to the processing unit D (the data processing unit 103-5), and "5" is stored in the register of the transmission unit thereof. Since the input terminal 151-1 corresponds to the node "1" and the output terminal 152-1 corresponds to the node "5", "5" is stored in the register of the reception unit of the communication unit 102-1, and "1" is stored in the register of the transmission unit thereof.

Next, in order to configure the data flow (b), "2" is stored in the register (the register 301) of the reception unit of the communication unit 102-4 corresponding to the processing unit C (the data processing unit 103-4), and "4" is stored in the register (the register 401) of the transmission unit of the communication unit 102-4. "4" is stored in the register of the reception unit of the communication unit 102-6 corresponding to the processing unit E (the data processing unit 103-6), and "6" is stored in the register of the transmission unit thereof. Since the input terminal 151-2 corresponds to the node "2" and the output terminal 152-2 corresponds to the node "6", "6" is stored in the register of the reception unit of the communication unit 102-1, and "2" is stored in the register of the transmission unit thereof.

Data Flow (a)

After the above settings have been set, if data is input from the input terminal 151-1, the communication unit 102-1 adds the connection identifier "1" to the input data, and outputs the resultant data to the communication unit 102-2. Since "6" is stored in the register 301 of the reception unit of the communication unit 102-2, the communication unit 102-2 does not take in the packet, and outputs the packet to the communication unit 102-3 as it is.

Since "1" is stored in the register 301 of the reception unit of the communication unit 102-3, the communication unit 102-3 takes in the packet having the connection identifier "1", and the data processing unit 103-3 performs processing B thereon, and outputs the result to the communication unit 102-3. Since "3" is stored in the register 401 of the transmission unit of the communication unit 102-3, the communication unit 102-3 generates a packet having the connection identifier "3", and outputs the generated packet to the communication unit 102-4.

Since "2" is stored in the register 301 of the reception unit of the communication unit 102-4, the communication unit 102-4 outputs the packet to the communication unit 102-5 as it is, without taking in the packet. Since "3" is stored in the register 301 of the reception unit of the communication unit 102-5, the communication unit 102-5 takes in the packet having the connection identifier "3", and the data processing unit 103-5 performs processing D thereon, and outputs the result to the communication unit 102-5. Since "5" is stored in the register 401 of the transmission unit of the communication unit 102-5, the communication unit 102-5 generates a packet having the connection identifier "5", and outputs the generated packet to the communication unit 102-6.

Since "4" is stored in the register 301 of the reception unit of the communication unit 102-6, the communication unit 102-6 outputs the packet to the communication unit 102-1 as it is, without taking in the packet. Since "5" is stored in the register 301 of the reception unit of the communication unit 102-1, the communication unit 102-1 takes in the packet having the connection identifier "5", and outputs a data portion thereof from the output terminal 152-1. In this way, processing B and processing D are sequentially performed on the data input from the input terminal 151-1, and the resultant data is output from the output terminal 152-1.

Data Flow (b)

On the other hand, if data is input from the input terminal 151-2, the communication unit 102-2 adds the connection identifier "2" to the input data, and outputs the resultant data to the communication unit 102-3. Since "1" is stored in the register 301 of the reception unit of the communication unit 102-3, the communication unit 102-3 outputs that packet to the communication unit 102-4 as it is, without taking in the packet.

Since "2" is stored in the register 301 of the reception unit of the communication unit 102-4, the communication unit 102-4 takes in the packet having the connection identifier "2", the data processing unit 103-4 performs processing C thereon, and outputs the result to the communication unit 102-4. Since "4" is stored in the register 401 of the transmission unit of the communication unit 102-4, the communication unit 102-4 generates a packet having the connection identifier "4", and outputs the generated packet to the communication unit 102-5.

Since "3" is stored in the register 301 of the reception unit of the communication unit 102-5, the communication unit 102-5 outputs the packet to the communication unit 102-6 as it is, without taking in the packet. Since "4" is stored in the register 301 of the reception unit of the communication unit 102-6, the communication unit 102-6 takes in the packet having the connection identifier "4", and the data processing unit 103-6 performs processing E thereon, and outputs the result to the communication unit 102-6. Since "6" is stored in the register 401 of the transmission unit of the communication unit 102-6, the communication unit 102-6 generates a packet having the connection identifier "6", and outputs the generated packet to the communication unit 102-1.

Since "5" is stored in the register 301 of the reception unit of the communication unit 102-1, the communication unit 102-1 outputs the packet to the communication unit 102-2 as it is, without taking in the packet. Since "6" is stored in the register 301 of the reception unit of the communication unit 102-2, the communication unit 102-2 takes in the packet having the connection identifier "6", and outputs a data portion thereof from the output terminal 152-2.

In this way, processing C and processing E are sequentially performed on the data input from the input terminal 151-2, and the resultant data is output from the output terminal 152-2. Therefore, it can be seen that even if data pieces are simultaneously input to the input terminal 151-1 and the input terminal 151-2, processing following the data flows that have been set is executed on the data pieces, and the data pieces are output from the output terminal 152-1 and the output terminal 152-2, respectively.

Operation Example 2

Next, a description is given regarding the case in which the sampling of data is performed in units of the prescribed number of pixels, and data pieces are output from different lines. For example, a description is given regarding the case in which JPEG compression is performed in one processing, and in another processing, only a DC component is extracted when performing JPEG compression so as to generate a reduced image. First, in the main data flow, data is input in a luminance/color difference format using YCC, DCT conversion is performed in processing B, quantization and zigzag scan conversion are performed in processing D, and variable length coding is performed in processing E, thus performing JPEG compression. On the other hand, in the sub-data flow, only a DC component is extracted from the output of processing B, and color conversion is performed in processing C so as to convert data into RGB data, thus obtaining a reduced image.

Figure 14A:
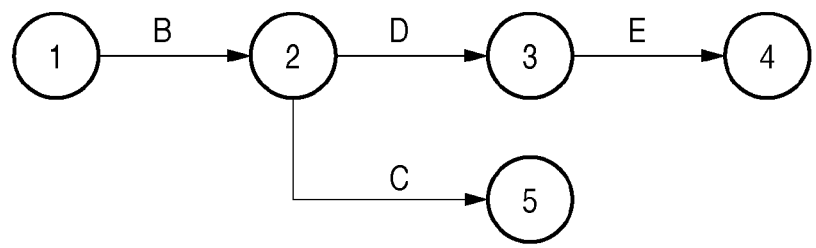
FIGS. 14A and 14B are diagrams showing examples of signal flow graphs.

Therefore, a signal flow graph showing such processing is the graph as shown in FIG. 14A. Note that since only a DC component is extracted in processing C, the counter 302 of the reception unit of the communication unit 102-4 is incremented by an increment of 64 (that is, +64 every time data is taken in). Further, since the DC component that is the input data from processing C is also used in processing D, the communication unit 102-4 sets a setting so as to output the packet that has been taken into the communication unit 102-5 as it is, without invalidating it. In other words, the input packet invalidating processing described above is set to OFF.

The following values are set in the register of the reception unit and the register of the transmission unit of the communication units 102:

"4" in the register of the reception unit of the communication unit 102-1, and "1" in the register of the transmission unit thereof;

"5" in the register of the reception unit of the communication unit 102-2, and an arbitrary value in the register of the transmission unit thereof (although any value may be set, 0 or the maximum value is normally set);

"1" in the register of the reception unit of the communication unit 102-3, and "2" in the register of the transmission unit thereof;

"2" in the register of the reception unit of the communication unit 102-4, and "5" in the register of the transmission unit thereof;

"2" in the register of the reception unit of the communication unit 102-5, and "3" in the register of the transmission unit thereof; and "3" in the register of the reception unit of the communication unit 102-6, and "4" in the register of the transmission unit thereof.

Hereinafter, an operation is described following a data flow. After the above-mentioned settings have been set, if data is input from the input terminal 151-1, the communication unit 102-1 adds the connection identifier "1" to the input data, and outputs the resultant data to the communication unit 102-2. Since "5" is stored in the register 301 of the reception unit of the communication unit 102-2, the communication unit 102-2 outputs the packet to the communication unit 102-3 as it is, without taking in the packet.

Since "1" is stored in the register 301 of the reception unit of the communication unit 102-3, the communication unit 102-3 takes in the packet having the connection identifier "1", the data processing unit 103-3 performs processing B (DCT conversion) thereon, and outputs the result to the communication unit 102-3. Since "2" is stored in the register 401 of the transmission unit of the communication unit 102-3, and the counter 402 of the transmission unit of the communication unit 102-3 is initialized to "0" before the processing starts, the communication unit 102-3 generates a packet having the connection identifier "2" and the count value "0", and outputs the generated packet to the communication unit 102-4. After outputting the packet, the counter 402 of the transmission unit of the communication unit 102-3 is incremented (+1) for the output of the next data.

In the register 301 of the reception unit of the communication unit 102-4, "2" is stored, and the counter 302 of the reception unit of the communication unit 102-4 is initialized to "0". Accordingly, the communication unit 102-4 takes in the packet having the connection identifier "2" and the count value "0", and inputs a data portion thereof to the data processing unit 103-4. At this time, in order to receive the next DC component, the counter 302 of the reception unit is incremented by +64. Further, in the communication unit 102-4, the input packet invalidating processing is set to OFF for data branching and, accordingly, the communication unit 102-4 outputs the packet that has been taken in, to the communication unit 102-5 as it is, without invalidating (erasing) it.

Processing C (color conversion) is performed on the data input to the data processing unit 103-4, and the resultant data is output to the communication unit 102-4. Since "5" is stored in the register 401 of the transmission unit of the communication unit 102-4, the communication unit 102-4 generates a packet having the connection identifier "5", and outputs the generated packet to the communication unit 102-5.

Since "2" is stored in the register 301 of the reception unit of the communication unit 102-5, the communication unit 102-5 outputs the packet having the connection identifier "5" to the communication unit 102-6 as it is, without taking in the packet. Since "3" is stored in the register 301 of the reception unit of the communication unit 102-6, the communication unit 102-6 outputs the packet to the communication unit 102-1 as it is. Since "3" is stored in the register 301 of the reception unit of the communication unit 102-1, the communication unit 102-1 outputs the packet to the communication unit 102-2 as it is.

Since "5" is stored in the register 301 of the reception unit of the communication unit 102-2, the communication unit 102-2 takes in the packet having the connection identifier "5", and outputs a data portion thereof from the output terminal 152-2. In this way, processing B is performed on the data input from the input terminal 151-1 and, thereafter, the resultant data is extracted in units of 64 pixels, then processing C is performed thereon, and the resultant data is output from the output terminal 152-2.

On the other hand, "2" is stored in the register 301 of the reception unit of the communication unit 102-5, and the counter 302 of the reception unit of the communication unit 102-5 is initialized to "0". Accordingly, the communication unit 102-5 takes in the packet having the connection identifier "2" and the count value "0", and inputs a data portion thereof to the data processing unit 103-5. At this time, in order to receive the next data (AC components), the counter 302 of the reception unit is incremented by +1. Further, the input packet invalidating processing is set to ON in the communication unit 102-5 since the packet taken in is not used in subsequent processing and, thus, the packet taken in is invalidated (erased).

Processing D (quantization and zigzag scan conversion) is performed on the data input to the data processing unit 103-5, and the resultant data is output to the communication unit 102-5. Since "3" is stored in the register 401 of the transmission unit of the communication unit 102-5, the communication unit 102-5 generates a packet having the connection identifier "3", and outputs the generated packet to the communication unit 102-6.

Since "3" is stored in the register 301 of the reception unit of the communication unit 102-6, the communication unit 102-6 takes in the packet having the connection identifier "3", the data processing unit 103-6 performs processing E (variable length coding) on that packet, and outputs the resultant packet to the communication unit 102-6. Since "4" is stored in the register 401 of the transmission unit of the communication unit 102-6, the communication unit 102-6 generates a packet having the connection identifier "4", and outputs the generated packet to the communication unit 102-1. Since "4" is stored in the register 301 of the reception unit of the communication unit 102-1, the communication unit 102-1 takes in the packet having the connection identifier "4", and outputs a data portion thereof from the output terminal 152-1. In this way, processing B, processing D, and processing E are sequentially performed on the data input from the input terminal 151-1, and the resultant data is output from the output terminal 152-1.

Operation Example 3

Figure 14B:
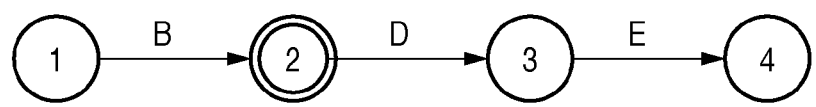

Next, a description is given regarding the case of outputting the output of an arbitrary data processing unit from different lines. The signal flow graph shown in FIG. 14B is a graph in which processing C has been eliminated from the signal flow graph shown in FIG. 14A. Therefore, since the input/output unit 101-2 is not used, an arbitrary node can be monitored. The following is a description regarding a method for outputting monitor output of a node 2 in the signal flow graph shown in FIG. 14B from the output terminal 152-2. Note that a node to be monitored is expressed as a double circle so as to be distinguished.

The following values are set in the register of the reception unit and the register of the transmission unit of the communication units 102:

"4" in the register of the reception unit of the communication unit 102-1, and "1" in the register of the transmission unit thereof;

"2" in the register of the reception unit of the communication unit 102-2, and an arbitrary value in the register of the transmission unit thereof (although any value may be set, 0 or the maximum value is normally set);

"1" in the register of the reception unit of the communication unit 102-3, and "2" in the register of the transmission unit thereof;

"5" (a value that is not used in the main data flow) in the register of the reception unit of the communication unit 102-4, and an arbitrary value in the register of the transmission unit thereof (although any value may be set, 0 or the maximum value is normally set);

"2" in the register of the reception unit of the communication unit 102-5, and "3" in the register of the transmission unit thereof; and "3" in the register of the reception unit of the communication unit 102-6, and "4" in the register of the transmission unit thereof.

Further, a setting is set in the communication unit 102-5 so as to output the packet that has been taken in to the communication unit 102-6 as it is, without invalidating the packet. Specifically, the input packet invalidating processing described above is set to OFF.

Hereinafter, an operation is described following a data flow. After the above-mentioned settings have been set, if data is input from the input terminal 151-1, the communication unit 102-1 adds the connection identifier "1" to the input data, and outputs the resultant data to the communication unit 102-2. Since "2" is stored in the register 301 of the reception unit of the communication unit 102-2, the communication unit 102-2 outputs the packet to the communication unit 102-3 as it is, without taking in the packet.

Since "1" is stored in the register 301 of the reception unit of the communication unit 102-3, the communication unit 102-3 takes in the packet having the connection identifier "1", the data processing unit 103-3 performs processing B thereon, and outputs the result to the communication unit 102-3. Since "2" is stored in the register 401 of the transmission unit of the communication unit 102-3, the communication unit 102-3 generates a packet having the connection identifier "2", and outputs the generated packet to the communication unit 102-4. Since "5" is stored in the register 301 of the reception unit of the communication unit 102-4, the communication unit 102-4 outputs the packet having the connection identifier "2" to the communication unit 102-5 as it is, without taking in the packet.

Since "2" is stored in the register 301 of the reception unit of the communication unit 102-5, the communication unit 102-5 takes in the packet having the connection identifier "2", and inputs a data portion thereof to the data processing unit 103-5. Note that for monitoring, the communication unit 102-5 outputs the packet that has been taken in to the communication unit 102-6 as it is, without invalidating the packet. This is because the input packet invalidating processing described above is set to OFF.

Since "3" is stored in the register 301 of the reception unit of the communication unit 102-6, the communication unit 102-6 outputs the packet having the connection identifier "2" to the communication unit 102-1 as it is, without taking in the packet. Since "4" is stored in the register 301 of the reception unit of the communication unit 102-1, the communication unit 102-1 outputs the packet having the connection identifier "2" to the communication unit 102-2 as it is, without taking in the packet. Since "2" is stored in the register 301 of the reception unit of the communication unit 102-2, the communication unit 102-2 takes in the packet having the connection identifier "2", and outputs a data portion thereof from the output terminal 152-2.

On the other hand, the data processing unit 103-5 performs processing D on the data portion of the packet that the communication unit 102-5 has taken in, and outputs the result to the communication unit 102-5. Since "3" is stored in the register 401 of the transmission unit of the communication unit 102-5, the communication unit 102-5 generates a packet having the connection identifier "3", and outputs the generated packet to the communication unit 102-6.

Since "3" is stored in the register 301 of the reception unit of the communication unit 102-6, the communication unit 102-6 takes in the packet having the connection identifier "3", the data processing unit 103-6 performs processing E thereon, and outputs the result to the communication unit 102-6. Since "4" is stored in the register 401 of the transmission unit of the communication unit 102-6, the communication unit 102-6 generates a packet having the connection identifier "4", and outputs the generated packet to the communication unit 102-1.

Since "4" is stored in the register 301 of the reception unit of the communication unit 102-1, the communication unit 102-1 takes in the packet having the connection identifier "4", and outputs a data portion thereof from the output terminal 152-1. In this way, processing B, processing D, and processing E are sequentially performed on the data input from the input terminal 151-1, and the resultant data is output from the output terminal 152-1 and, also, from the output terminal 152-2, the output of processing B that is an intermediate result of the series of processing can be obtained.

As described above, by adding another data input/output unit, it is possible to simultaneously process a plurality of data flows. Further, since it is possible to simultaneously output data in an intermediate node, other data processing apparatuses can also use intermediate data from the processing.

Note that although a value is set to the register 401 of the transmission unit of the communication unit 102, such a value may be fixed in each of the communication units. For example, "1" may be fixed in the communication unit 102-1, "2" in the communication unit 102-2, . . . , and "m" in the communication unit 102-*m*. In this case, although the node number of the destination of the arrow that shows a process in the signal flow graph is fixed for each process, since the source of the arrow (input) can be programmed, it is possible to perform an operation similar to that as described above.

Further, in the embodiment described above, although a valid flag showing that a packet is valid is used, the configuration is not limited to this. For example, a specific connection identifier (for example, "0") may be used to show that a packet including it is an invalid packet.

As described above, the data processing apparatus described above is provided with a plurality of data processing units that perform data processing, a data input/output unit that inputs and outputs data, and a plurality of communication units that connect the data processing units and the data input/output unit. Furthermore, the data processing apparatus is provided with the following:

A means for storing a connection identifier with which an input unit and an output unit of the communication unit that is connected to each module identify a logical connection for processing data;

a data output means for adding a connection identifier stored in the output unit of the communication unit to data when the data is output from the communication unit; and a data input means for comparing the connection identifier added to the data input to the input unit of the communication unit with a connection identifier stored in the input unit of the communication unit, and taking the data whose connection identifier matched into the module.

In this way, the data processing apparatus controls a data path using numbers (connection identifiers) for identifying a node in a signal flow graph that shows the flow of data processing. Accordingly, since it is possible to realize complicated data paths, such as separating a data path into branches, integrating data paths, or simultaneously executing a plurality of data paths, even if each processing module is constituted from hardware (a circuit whose function cannot be changed using a program), flexible processing can be realized. Further, since the erasing of a packet can also be controlled for each processing module, a ring bus can be efficiently used.

According to the present invention, it is possible to provide technology with which the order of processing, such as pipeline processing, can be changed with a simple configuration if pipeline processing or the like is performed using a plurality of modules to which a prescribed function has been assigned.

Further, it is possible to provide technology that enables data processing with complicated data paths, such as separating a data path into branches, integrating data paths, or simultaneously executing a plurality of data paths.

OTHER EMBODIMENTS

Further, in the embodiment described above, although a valid flag showing that a packet is valid is used, a packet length may be shortened by using a specific connection identifier (for example, "0") to show that a packet including it is an invalid packet.

Further, it is sufficient to input data obtained from the outside in the form of a packet handled in the ring bus, as it is. Furthermore, it is sufficient that the processing unit may interpret a packet and process the packet as it is.

The diagrams schematically showing configurations of the units of the data processing apparatus referenced in the embodiments described above are intended to describe a circuit and the connecting relationship of functional means, and are not intended to limit the positional relationship of the configurations and the number thereof. For example, in order to implement the present invention, it is sufficient to use three or more communication units (including an input/output unit). Further, it is sufficient to use two or more processing units.

The diagrams schematically showing configurations of the units of the data processing apparatus referenced in the embodiments described above are intended to describe a circuit and the connecting relationship of functional means, and are not intended to limit the positional relationship of the configurations. For example, a processing module may be formed as a separate chip, or may be formed as a single chip. The same follows for the data processing unit and the communication unit. Of course, the configuration of the present invention may be formed as one chip.

Further, in the embodiments described above, although only an example in which single pipeline processing is set is described, the present invention can be applied to a parallel processing unit that executes a plurality of pipeline processing using time division multiplexing. In that case, it is sufficient that a path identifier for identifying pipeline processing to which a packet belongs is provided to the format of the packet, and each module is also caused to store a setting according to each module, for each pipeline processing. Further, a register that identifies an input packet for identifying input data, and a register that stores an identifier added to a packet to be output must also to store an identifier for each pipeline processing.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-049713, filed on Mar. 3, 2009, which is hereby incorporated by reference herein in its entirety.

The invention claimed is:

1. A control apparatus which controls sequential processing by causing control of a data processing apparatus comprising a plurality of processing units to perform processing in a logical processing order, wherein the control apparatus is a processor, wherein the data processing apparatus comprises:
    a plurality of communication units; and
    the plurality of processing units,
wherein each of the plurality of processing units is connected to one of the plurality of communication units,
wherein the plurality of communication units are connected to a ring bus, and each of the plurality of communication units receives a packet from a previous communication unit connected via the ring bus and transmits a packet to a next communication unit connected via the ring bus,
wherein a packet transmitted in the ring bus can hold data and identification information,
wherein each of the plurality of communication units comprises:
    a first storage unit which holds first connection information for identifying a packet of which data should be processed among received packets; and
    a second storage unit which holds second connection information to be set to identification information of a packet holding a processed data in a case that the processed data processed by a corresponding processing unit is output, the second connection information being a value corresponding to first connection information held in a first storage unit of a communication unit connected to a respective processing unit which subsequently processes the processed data,
wherein each of the plurality of communication units determines whether data, which is held in a packet received from a previous communication unit, should be processed, the determination being based on the first connection information held by the first storage unit of the communication unit receiving the packet and identification information held in the packet received from the previous communication unit, the identification information having been set based on second connection information held by the second storage unit of the previous communication unit,
wherein the control apparatus, before performing the sequential processing, sets the first connection information of the first storage unit and the second connection information of the second storage unit, based on a logical processing order for the sequential processing, for at least two communication units among the plurality of communication units.

2. The control apparatus according to claim 1, wherein in a first processing unit and a second processing unit in which a process should be performed next to be the first processing unit among the plurality of processing units which perform the sequential processing, the control apparatus sets the same value to second connection information held by the second storage unit in the communication unit connected to the first processing unit and the first connection information held by the first storage unit in the communication unit connected to the second processing unit.

3. The control apparatus according to claim 1, wherein in a case that the sequential processing does not include separation and integration in the logical processing order, the control apparatus sets different information to the first connection information of the first storage unit of the communication unit corresponding to each of the plurality of processing units used for the sequential processing, and the control apparatus sets different information to the second connection information of the second storage unit of the communication unit corresponding to each of the plurality of processing units used for the sequential processing.

4. The control apparatus according to claim 1, wherein in a case that the sequential processing includes separation in the logical processing order, the control apparatus sets the same information to the first connection information of the first storage unit of the communication unit corresponding to each of two processing units in which are separated among the plurality of communication units used for the sequential processing.

5. The control apparatus according to claim 1, in a case that the sequential processing includes integration in the logical processing order, the control apparatus sets the same information to the second connection information of the second storage unit of the communication unit corresponding to two processing units before integration among the plurality of processing units used for the sequential processing, and to the first connection information of the first storage unit of the communication unit corresponding to processing unit to be integrated among the plurality of processing unit used for the sequential processing.

6. The control apparatus according to claim 1, before performing the sequential processing, the control apparatus inputs data to be processed in the sequential processing to the data processing apparatus, after the control apparatus completes setting of the first connection information and the second connection information of the plurality of communication units.

7. The control apparatus according to claim 1, wherein, the communication unit of the data processing apparatus to be controlled by the control apparatus further comprises:
    a first counter which increments by a first value which is used for identifying received packed and,
    a second counter which increments by a second value for setting a processed data to a packet in outputting the processed data,
    wherein the packed can hold a count value indicating an order in which data held by the packet is input to the data processing apparatus, and
    the control apparatus, before performing the sequential processing, initializes the first counter and the second counter, and sets the first value and the second value based on the logical processing order of the sequential processing.

8. The control apparatus according to claim 7, wherein in a case that the sequential processing does not include separation and integration in the logical processing order, the control apparatus sets "1" to the first value and the second value.

9. The control apparatus according to claim 7, wherein in a case that the sequential processing includes integration in the logical order, the control apparatus initializes different value for the second counter of the communication unit corresponding to two processing units before integration among the plurality of processing units used for the sequential processing and sets the second value according to the number of the integration to the second counter, and further the control apparatus sets "1" to the first counter of the communication units to be integrated among the plurality of processing units used for the sequential processing.

10. A method of controlling sequential processing by causing control of a data processing apparatus comprising a plurality of processing units to perform processing in a logical processing order,
    wherein the data processing apparatus comprises:
        a plurality of communication units; and
        the plurality of processing units, wherein each of the plurality of processing units is connected to one of the plurality of communication units, wherein the plurality of communication units are connected to a ring bus, and each of the plurality of communication units receives a packet from a previous communication unit connected via the ring bus and transmits a packet to a next communication unit connected via the ring bus, wherein a packet transmitted in the ring bus can hold data and identification information, wherein each of the plurality of communication units comprises:

a first storage unit which holds first connection information for identifying a packet of which data should be processed among received packets, and a second storage unit which holds second connection information to be set to identification information of a packet holding a processed data in a case that the processed data processed by corresponding processing unit is output, the second connection information being a value corresponding to first connection information held in a first storage unit of a communication unit connected to a respective processing unit which subsequently processes the processed data, the method comprising:

each of the plurality of communication units determining whether data, which is held in a packet received from a previous communication unit, should be processed, the determination being based on the first connection information held by the first storage unit of the communication unit receiving the packet and identification information held in the packet received from the previous communication unit, the identification information having been set based on second connection information held by the second storage unit of the previous communication unit; and a control step of, before performing the sequential processing, setting the first connection information of the first storage unit and the second connection information of the second storage unit, based on a logical processing order for the sequential processing, for at least two communication units among the plurality of communication units.

11. The control apparatus according to claim 1, wherein the same value is set to the second connection information held by the second storage unit in one of the plurality of communication units and the first connection information held by the first storage unit in another one of the plurality of communication units, a processing unit to which the one of the plurality of communication units is connected being next, in the logical processing order, to a processing unit to which the another one of the plurality of communication units is connected.

12. The control apparatus according to claim 1, wherein, when data processed by a processing unit is output, the identification information held by the packet holding the processed data is overwritten with the second connection information.

13. The control apparatus according to claim 1, wherein the plurality of processing units are heterogeneous processing units.

14. A control apparatus which controls sequential processing by causing control of a data processing apparatus comprising a plurality of processing units to perform processing in a logical processing order, wherein the control apparatus is a processor, wherein the data processing apparatus comprises:

a plurality of communication units; and the plurality of processing units, wherein each of the plurality of processing units is connected to one of the plurality of communication units, wherein the plurality of communication units are connected to a ring bus, and each of the plurality of communication units receives a packet from a previous communication unit connected via the ring bus and transmits a packet to a next communication unit connected via the ring bus, wherein a packet transmitted in the ring bus can hold data and identification information, wherein each of the plurality of communication units comprises:

a first storage unit which holds first connection information for identifying a packet of which data should be processed among received packets; and a second storage unit which holds second connection information to be set to identification information of a packet holding a processed data in a case that the processed data processed by a corresponding processing unit is output, the second connection information being a value corresponding to first connection information held in a first storage unit of a communication unit connected to a respective processing unit which subsequently processes the processed data, wherein the control apparatus, before performing the sequential processing, sets the first connection information of the first storage unit and the second connection information of the second storage unit, based on a logical processing order for the sequential processing, for at least two communication units among the plurality of communication units, wherein the first connection information held by the first storage unit of one of the plurality of communication units corresponds to the second connection information held by the second storage unit of a communication unit connected to a processing unit which is previous, in the logical processing order, to a processing unit of the one of the plurality of communication units, and wherein the second connection information held by the second storage unit of the one of the plurality of communication units corresponds to the first connection information held by the first storage unit of a communication unit connected to a processing unit which is next, in the logical processing order, to the processing unit of the one of the plurality of communication units.

15. The control apparatus according to claim 1, wherein the prescribed order is set regardless of physical connection order of the plurality of communication units, and wherein the communication unit does not take data held in the packet into the respective processing unit when it is determined that the data should not be processed.

* * * * *